United States Patent
Lemon et al.

(10) Patent No.: US 8,367,028 B2
(45) Date of Patent: Feb. 5, 2013

(54) AMORPHOUS ACIDIC MATERIALS, THEIR SYNTHESIS AND USE

(75) Inventors: Robert C. Lemon, Easton, PA (US); Gordon J. Kennedy, Washington, NJ (US); Michael C. Kerby, Center Valley, PA (US); Kirk D. Schmitt, Pennington, NJ (US); James C. Vartuli, West Chester, PA (US); Kun Wang, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 481 days.

(21) Appl. No.: 12/592,921

(22) Filed: Dec. 4, 2009

(65) Prior Publication Data

US 2010/0189620 A1   Jul. 29, 2010

Related U.S. Application Data

(60) Provisional application No. 61/200,963, filed on Dec. 5, 2008.

(51) Int. Cl.
*C01B 33/26* (2006.01)

(52) U.S. Cl. .................................... 423/327.1

(58) Field of Classification Search ............... 423/327.1, 423/328.1, 329.1, 330.1, 332, 333, 600, 625, 423/628, 700–718; 502/60, 232, 263, 355, 502/407, 414, 415
See application file for complete search history.

(56) References Cited

U.S. PATENT DOCUMENTS

| | | | |
|---|---|---|---|
| 3,354,078 A | 11/1967 | Miale et al. | |
| 4,289,740 A | 9/1981 | Estes | |
| 4,407,782 A | 10/1983 | Estes | |
| 5,098,684 A | 3/1992 | Kresge et al. | |
| 5,344,989 A | 9/1994 | Corbin et al. | |
| 5,503,818 A | 4/1996 | Nicolaides | |
| 6,225,255 B1 * | 5/2001 | Shibasaki et al. | 502/300 |
| 6,585,952 B1 | 7/2003 | Pinnavaia et al. | |
| 2002/0131930 A1 | 9/2002 | Pinnavaia et al. | |
| 2005/0274646 A1 | 12/2005 | Lawson et al. | |
| 2006/0011512 A1 | 1/2006 | Espinoza et al. | |

FOREIGN PATENT DOCUMENTS

| | | |
|---|---|---|
| EP | 1 783 099 A1 | 5/2007 |
| WO | WO 2009/056710 A2 | 5/2009 |
| WO | WO 2009/056711 A2 | 5/2009 |
| WO | WO 2009/144412 A2 | 12/2009 |
| WO | WO 2009/144413 A1 | 12/2009 |
| WO | WO 2009/153420 A1 | 12/2009 |

OTHER PUBLICATIONS

Letter to the Editors, "Superactive Crystalline Aluminosilicate Hydrocarbon Catalysts", *Journal of Catalysis* 4, 527-529, 1965.
J. N. Miale, et al., Catalysis by Crystalline Aluminosilicates IV. Attainable Catalytic Cracking Rate Constants, and Superactivity, *Journal of Catalysis* 6, 278-287, 1966.
ZSM-5 Substitutional Series, *Journal of Catalysis* 61, 395, 1980.

(Continued)

*Primary Examiner* — Melvin C Mayes
*Assistant Examiner* — Stefanie Cohen
(74) *Attorney, Agent, or Firm* — Liza Montalvo; David Weisberg (57) ABSTRACT

A porous material comprises oxides of silicon and aluminum and is substantially free of X-ray diffraction peaks in its calcined form. The material is characterized by the following properties:
  (a) a Bronsted acid site density as measured by temperature programmed ammonia adsorption of at least 0.005 mmol/g;
  (b) an alpha value of at least 0.5;
  (c) a specific surface area of about 50 to about 160 m$^2$ g$^{-1}$;
  (d) a total pore volume of about 0.14 to about 1.0 cm$^3$ g$^{-1}$; and
  (d) a micropore volume of about 0.001 to about 0.015 cm$^3$ g$^{-1}$.

12 Claims, 8 Drawing Sheets

OTHER PUBLICATIONS

R. Szostak, "Molecular Sieves".

Y. Liu, et al., "Steam-Stable Aluminosilicate Mesostructures Assembled from Zeolite Type Y Seeds", *J. Am. Chem. Soc.*, 2000, 122, 8791-8792.

A. Corma, et al., "Amorphous microporous molecular sieves with different pore dimensions and topologies: Synthesis, characterization and catalytic activity", *Microporous and Mesoporous Materials*, 89, 2006, 39-46.

L. Frunz, "ZSM-5 precursors assembled to a mesoporous structure and its subsequent transformation into a zeolitic phase—from low to high catalytic activity", *Microporous and Mesoporous Materials* 88, 2006, 152-162.

K. S. Triantafyllidis, et al., "Structural, compositional and acidic characteristics of nanosized amorphous or partially crystalline ZSM-5 zeolite-based materials", *Microporous and Mesoporous Materials* 75, 2004, 89-100.

C. P. Nicolaides, et al., "Characterization by ammonia adsorption microcalorimetry of substantially amorphous or partially crystalline ZSM-5 materials and correlation with catalytic activity", *Applied Catalysis A: General* 223, 2002, 29-33.

C. P. Nicolaides, "A novel family of solid acid catalysts: substantially amorphous or partially crystalline zeolitic materials", *Applied Catalysis A: General* 185, 1999, 211-217.

R. Mokaya, et al., "Physicochemical Characterisation and Catalytic Activity of Primary Amine Templated Aluminosilicate Mesoporous Catalysts", *Journal of Catalysis* 172, 211-221, 1997.

P. Jacobs, et al., "Evidence for X-Ray-amorphous Zeolites", J.C.S. Chem. Comm., 1981, 591-593.

X. Wang, et al., "Synthesis of large ZSM-5 crystals under high pressure", Solid-State Chemistry of Inorganic Materials III (Materials Research Society Symposium Proceedings, 2001, gg8.1.1-gg8.1.6.

H. Ghobarkar, et al., "Zeolite Synthesis by the High-Pressure Hydrothermal Method: Synthesis of Natural 6-Ring Zeolites with Different Void Systems", Chem. Int. Ed. 40, 20, 2001, pp. 3831-3833.

H. Ghobarkar, et al., Journal of Solid State Chemistry, 173, 2003, pp. 27-31.

L. E. Iton, et al., "Small-Angle Neutron-Scattering Studies of the Template-Mediated Crystallization of ZSM-5-Type Zeolite", *Langmuir*, 1992, 8, 1045-1048.

J. M. Fedeyko, et al., "Initial Stages of Self-Organization of Silica-Alumina Gels in Zeolite Synthesis", *Langmuir*, 2007, 23, 4532-4540.

A. Firouzi, et al., "Cooperative Organization of Inorganic-Surfactant and Biomimetic Assemblies", *Science*, vol. 267, Feb. 24, 1995.

\* cited by examiner

AMORPHOUS ACIDIC MATERIALS, THEIR SYNTHESIS AND USE

Non Provisional Application based on U.S. Ser. No. 61/200,963 filed Dec. 5, 2008.

FIELD

This invention relates to amorphous, acidic materials, their synthesis and their use in acid catalysis.

BACKGROUND

Microporous crystalline molecular sieves, such as zeolites and SAPOs, are useful as adsorbents and catalysts in a wide variety of commercial applications. For example, zeolites are formed by a crystal lattice of TO4 tetrahedra which share all their vertices giving rise to a three-dimensional structure containing channels and/or cavities of molecular dimensions. They have variable chemical compositions, with T generally representing atoms with a formal oxidation state of +3 or +4, such as for example Si, Ge, Ti, Al, B or Ga, among others. Depending on the nature and ratio of the different T atoms, zeolitic materials can exhibit significant acid activity.

The existence of channels and cavities of uniform dimension in the interior of microporous crystalline molecular sieves gives rise to a high specific area. In addition, the fact that the pore size is uniform and with a narrow distribution permits these crystalline materials to selectively adsorb molecules of differing size depending on the dimensions of the channels.

Moreover, the crystal structure of each zeolite or SAPO, with its specific system of channels and cavities, gives rise to a characteristic X-ray diffraction pattern. Hence, microporous crystalline molecular sieves can be differentiated from each other by their range of chemical composition and their X-ray diffraction pattern. Both characteristics (crystal structure and chemical composition) also determine the physico-chemical properties of each molecular sieve and hence its possible application in different industrial processes.

Most zeolitic materials have a pore size of less than 13 Å which often limits their ability to process very large molecules. Also known are mesoporous crystalline molecular sieves, such as MCM-41 (see U.S. Pat. No. 5,098,684), which have an ordered arrangement of uniformly sized pores having a diameter between 15 and greater than 100 Å. Moreover, the pore size of a given MCM-41 material is very narrow and the mean pore diameter can be tailored by the method used for its synthesis. However, the low acidity of MCM-41 materials has limited their utility in many catalytic processes.

Recently, interest has refocused on amorphous or substantially amorphous materials since these materials offer the possibility of providing catalysts with reasonably high surface area. However, traditional amorphous materials have significantly lower acid strength than microporous crystalline molecular sieves and hence one area of interest in current research is the development of amorphous materials with enhanced acid strength.

For example, in an article entitled "Structural, compositional and acidic characteristics of nanosized amorphous or partially crystalline ZSM-5 zeolite-based materials", *Microporous and Mesoporous Materials* 75 (2004), pages 89-100, Triantafyllidis et al. report that the synthesis of X-ray amorphous and partially crystalline nanosized zeolite-based materials can be accomplished by lowering the reaction temperature used to produce ZSM-5 from a typical hydrothermal synthesis mixture containing tetrapropylammonium ions as a structure directing agent. Based on $NH_3$-TPD and $^{27}Al$ MAS NMR data, the resultant X-ray amorphous materials were reported to possess tetrahedral aluminum atoms that were more zeolitic in nature and their associated protons more acidic than a conventional amorphous silica-alumina standard. For example, the material synthesized at 50° C., termed NAS-50, had an acid site density of between 0.05 and 0.19 mmol/g, depending on degree of ion exchange, based on $NH_3$-TPD data, together with a total pore volume of 1.084 $cm^3 g^{-1}$, a micropore volume of 0.011 $cm^3 g^{-1}$ and specific surface area of 142 $m^2 g^{-1}$. European Patent Application No. 1 783 099 A1 discloses a microporous amorphous material having a chemical composition in the calcined and anhydrous state obeying the following empirical formula:

$$x(M_{1/n}XO_2):y\ YO_2:SiO_2$$

wherein x has a value of less than 0.2, and can be equal to zero, y has a value of less than 0.2, and can be equal to zero, M is selected from among $H^+$, one or more inorganic cations having a charge +n and a mixture of same; X is one or more chemical elements in oxidation state +3; and Y is one or more elements in oxidation state +4, and wherein the microporous amorphous material has a uniform pore distribution and a micropore volume of greater than or equal to 0.05 $cm^3 g^{-1}$ and which has a specific surface area of greater than 100 $m^2 g^{-1}$.

According to the invention, a novel porous aluminosilicate-based material has now been synthesized which, although substantially X-ray amorphous in its calcined form, exhibits significant Bronsted acid activity and an alpha value at or near one, making the material attractive for certain catalytic applications, such as fluid catalytic cracking, hydroprocessing and reforming.

SUMMARY

In one aspect, the invention resides in a porous material comprising oxides of silicon and aluminum and being substantially free of X-ray diffraction peaks in its calcined form, wherein the material has the following properties:

(a) a Bronsted acid site density as measured by temperature programmed ammonia adsorption of at least 0.005, such as about 0.01 to about 0.08 mmol/g;

(b) an alpha value of at least 0.5, such as about 0.5 to about 2;

(c) a specific surface area of about 50 to about 160 $m^2 g^{-1}$;

(d) a total pore volume of about 0.14 to about 1.0 $cm^3 g^{-1}$; and (e) a micropore volume of about 0.001 to about 0.015 $cm^3 g^{-1}$.

Typically, said material has an alpha value of about 0.7 to about 1.3.

Conveniently, said material has an $^1H$ NMR spectrum including a peak characteristic of Bronsted acidity at around 3.5 ppm.

Conveniently, said material has a silica to alumina molar ratio of about 1 to about 1000, such as about 5 to about 200.

In a further aspect, the invention resides in a method of synthesizing the porous material described herein, the method comprising:

(a) preparing a reaction mixture comprising water, a source of silica, a source of alumina and an organic compound selected from the group consisting of diquaternary ammonium compounds of the formula $(CH_3)_3N(CH_2)_nN(CH_3)_3X_2$, where n ranges from 2 to 10 and X can be Cl, Br, and I, (2-hydroxyethyl)ammonium compounds, and (b) heating the reaction mixture at a temperature of about 75° C. to about 250° C., such as about 100° C. to about 200° C., for a time of about 12 hours to about 200 hours, such as about 24 hours to about 168 hours.

Generally, the reaction mixture comprises a source of alkali metal cations, such as source of sodium cations.

In still yet a further aspect, the invention resides in the use of the porous material described herein as a catalyst or catalyst support in organic conversion processes.

DETAILED DESCRIPTION OF THE EMBODIMENTS

Described herein is a novel porous acidic material which is composed of oxides of at least silicon and aluminum and which, in its calcined form, is substantially free of X-ray diffraction peaks. Also described are methods of synthesizing the present porous acidic material and of using the material as a catalyst or catalyst support in organic conversion processes.

As used herein, the term "substantially free of X-ray diffraction peaks" means that when the calcined form of present porous acidic material is subjected to X-ray diffraction analysis with a Scintag diffraction system, equipped with a Peltier-cooled detector, using copper K-alpha radiation, the spectrum obtained exhibits no peaks having an intensity more than 10% above the background level.

In its calcined and anhydrous form, the present porous acidic material has a composition involving the molar relationship:

$$(n)SiO_2:Al_2O_3$$

where n is from about 1 to about 1000, such as about 5 to about 200.

The present material exhibits significant acid activity in that it has a Bronsted acid site density as measured by temperature programmed ammonia adsorption of at least 0.005 mmol/g, such as about 0.01 to about 0.08 mmol/g. Moreover, the material has an $^1$H NMR spectrum including a peak characteristic of Bronsted acidity at around 3.5 ppm. In addition, the material has an alpha value of at least 0.5, such as from about 0.5 to about 2, for example from about 0.7 to about 1.3. In this respect, the alpha value is an approximate indication of the catalytic cracking activity of a material as compared to a standard catalyst. It gives the relative rate constant of the material for hexane cracking (rate of normal hexane conversion per volume of catalyst per unit time) compared to the activity of a standard silica-alumina cracking catalyst taken as an Alpha of 1 (Rate Constant=0.016 sec$^{-1}$). The Alpha Test is described in U.S. Pat. No. 3,354,078; in the *Journal of Catalysis*, 4, 527 (1965); 6, 278 (1966); and 61, 395 (1980), each incorporated herein by reference as to that description. The experimental conditions of the test used herein include a constant temperature of 538° C. and a variable flow rate as described in detail in the *Journal of Catalysis*, 61, 395 (1980).

In addition to acid activity, the present material is defined by its specific porosity and surface area properties.

In particular, the material has a total pore volume of about 0.14 to about 1.0 cm$^3$ g$^{-1}$, such as about 0.15 to about 0.97 cm$^3$ g$^{-1}$, and a micropore volume of about 0.001 to about 0.015 cm$^3$ g$^{-1}$. In this respect, it is to be appreciated that the micropore volume of a material is the total volume per unit weight of the material that is occupied by pores having a diameter less than 2 nm.

In addition, the material has a total surface area of about 50 to about 160 m$^2$ g$^{-1}$.

The present porous acidic material can be synthesized from a reaction mixture comprising water, a source of silica, a source of alumina, an organic compound, R, selected from the group consisting of diquaternary ammonium compounds of the formula $(CH_3)_3N(CH_2)_nN(CH_3)_3X_2$, where n ranges from 2 to 10, such as 4, and X can be Cl, Br, and I, (2-hydroxyethyl)ammonium compounds and mixtures thereof. In addition, organic amines and mixtures thereof, may also be suitable sources of organic compounds R. Optionally a source of alkali metal cations, M$^+$, such as source of sodium cations, may also be used in the reaction mixture. Typically, the reaction mixture has a composition, in terms of mole ratios of oxides, within the following ranges:

| Reactants | Useful | Preferred |
|---|---|---|
| SiO$_2$/Al$_2$O$_3$ | 1 to 1000 | 5 to 200 |
| H$_2$O/SiO$_2$ | 1 to 10000 | 100 to 7000 |
| OH$^-$/SiO$_2$ | 0.01 to 1 | 0.1 to 0.5 |
| M/SiO$_2$ | 0.01 to 1 | 0.1 to 0.5 |
| R/SiO$_2$ | 0.01 to 1 | 0.1 to 0.5 |

Suitable sources of silica that can be used to produce the reaction mixture described above include colloidal silica, precipitated silica, potassium silicate, sodium silicate, and fumed silica. Similarly, suitable sources of aluminum oxide include hydrated aluminum oxides, such as boehmite, gibbsite, and pseudoboehmite, sodium aluminate and oxygen-containing aluminum salts, such as aluminum nitrate. Suitable sources of alkali metal include sodium and/or potassium hydroxide. Suitable sources of the organic ammonium cations include the halides and hydroxides, especially the iodides.

When the reaction mixture has been prepared, reaction to produce the desired porous acidic material is conducted under either static or stirred conditions in a suitable reactor vessel, such as for example, polypropylene jars or stainless steel autoclaves optionally lined with Teflon, at a temperature of about 75° C. to about 250° C., such as about 100° C. to about 200° C., for a time of about 12 hours to about 200 hours, such as about 24 hours to about 168 hours. Thereafter, the solid product is separated from the liquid and recovered.

It is to be appreciated that the conditions used to produce the material of this invention will also, given enough time, often produce crystalline zeolites as impurities or as the primary product. This is undesirable, as the catalytic properties of zeolites are not the same as the material of this invention. Consequently, it is important to be able to produce the material of this invention substantially free of zeolites.

Figure 1:
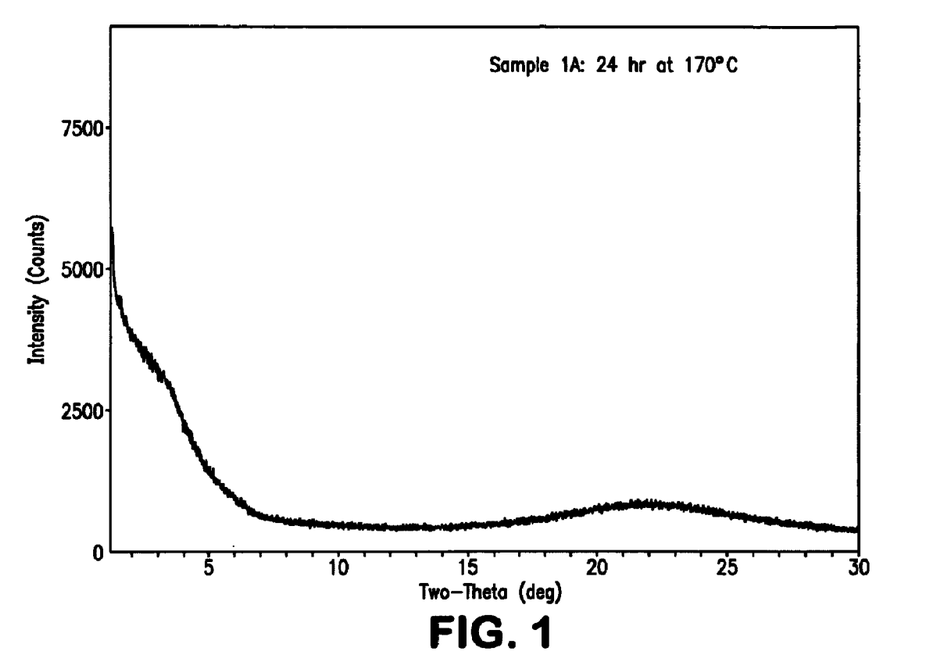
FIGS. 1 to 12 are X-ray diffraction patterns of the products obtained in Example 1.
Figure 2:
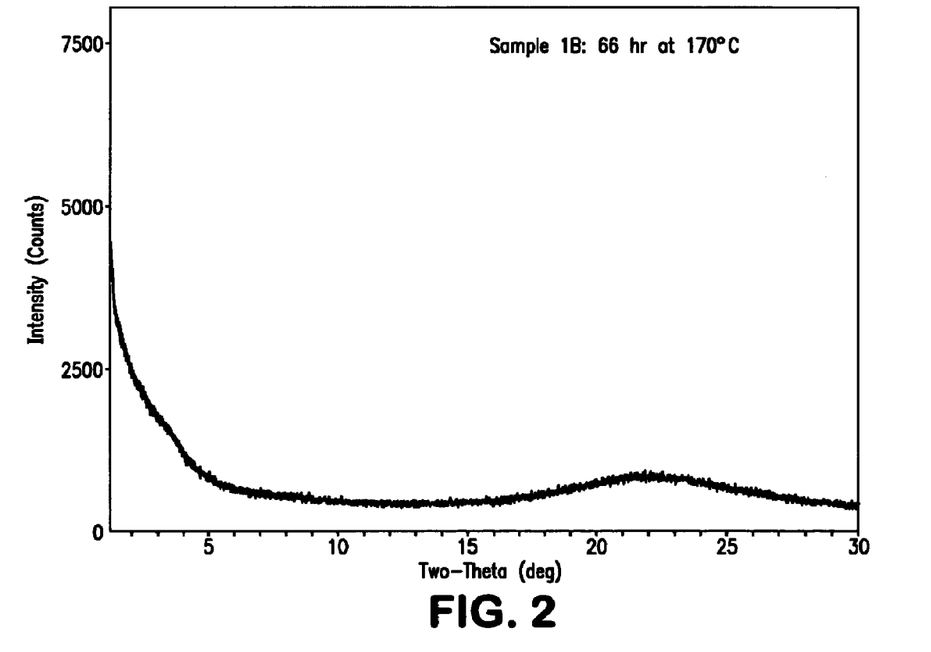
Figure 3:
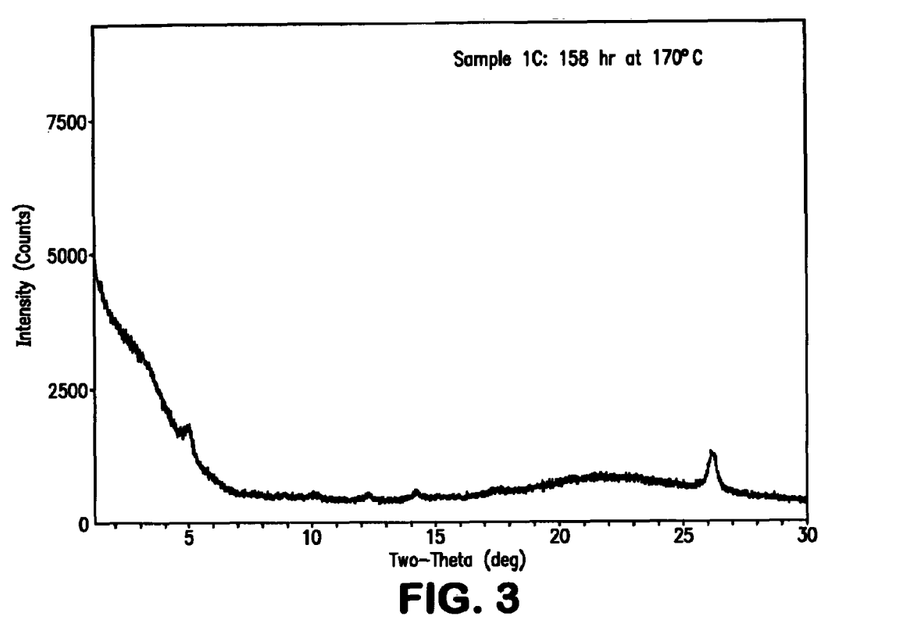
Figure 4:
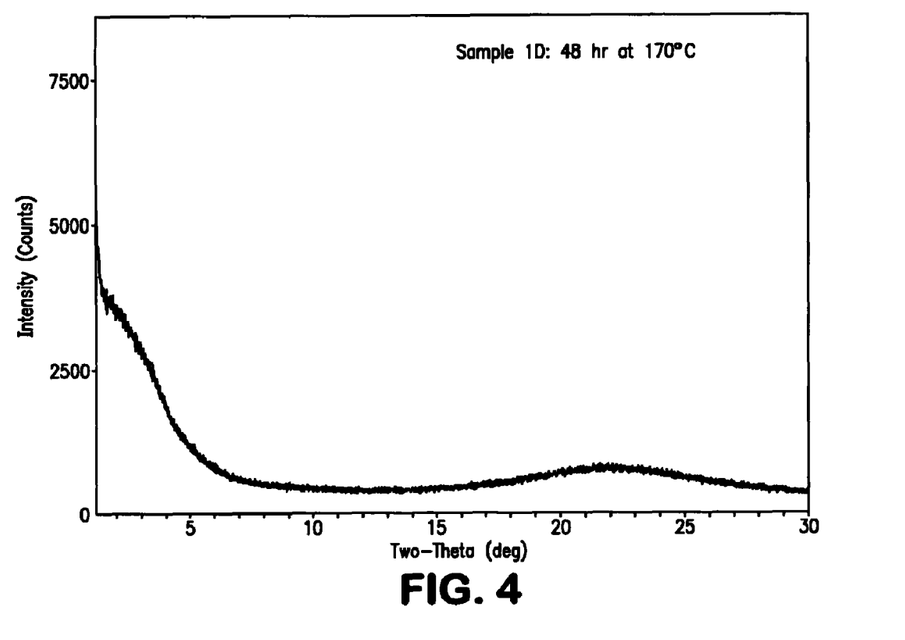
Figure 5:
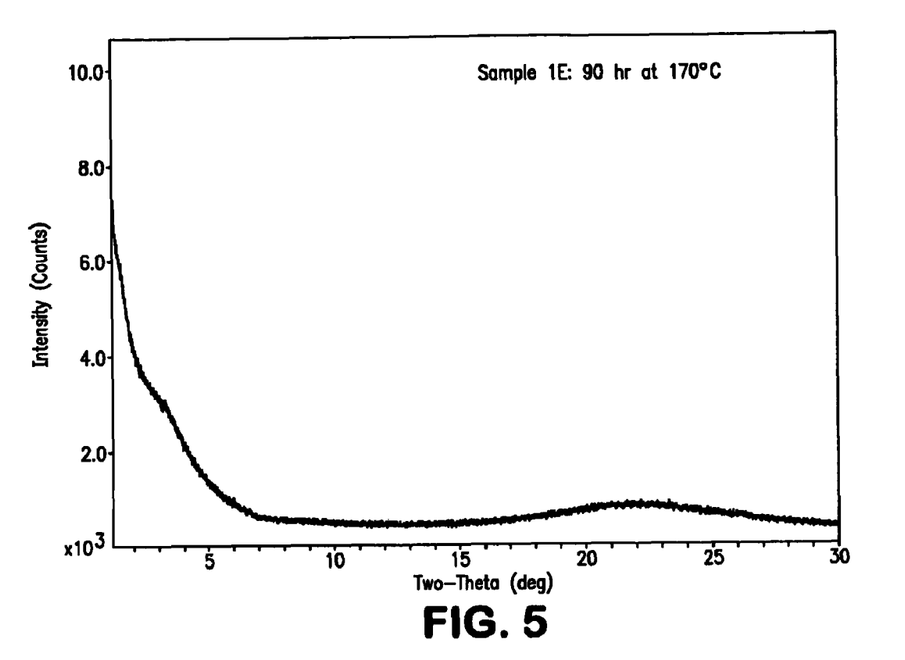
Figure 6:
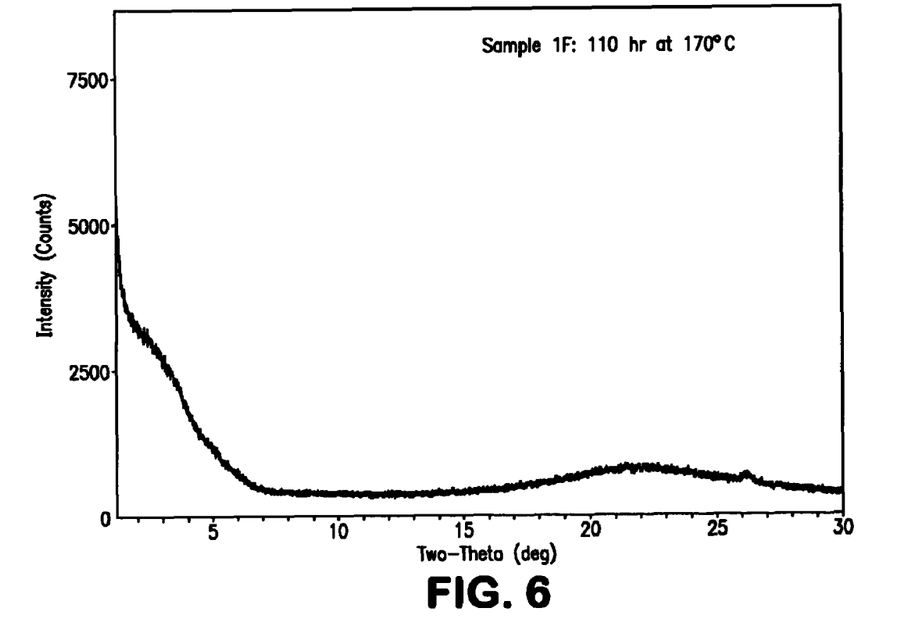
Figure 7:
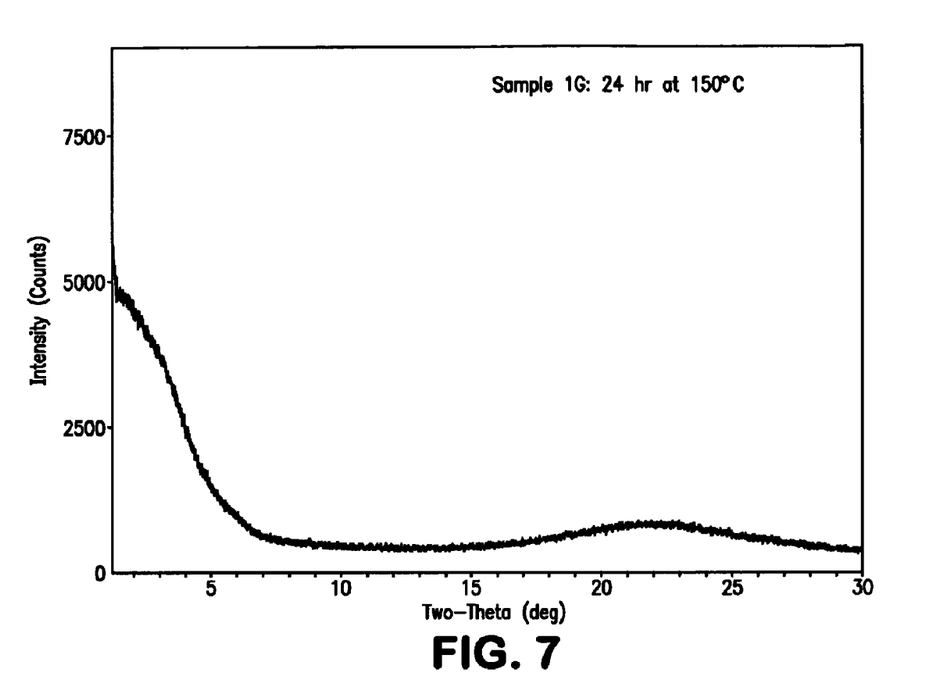
Figure 8:
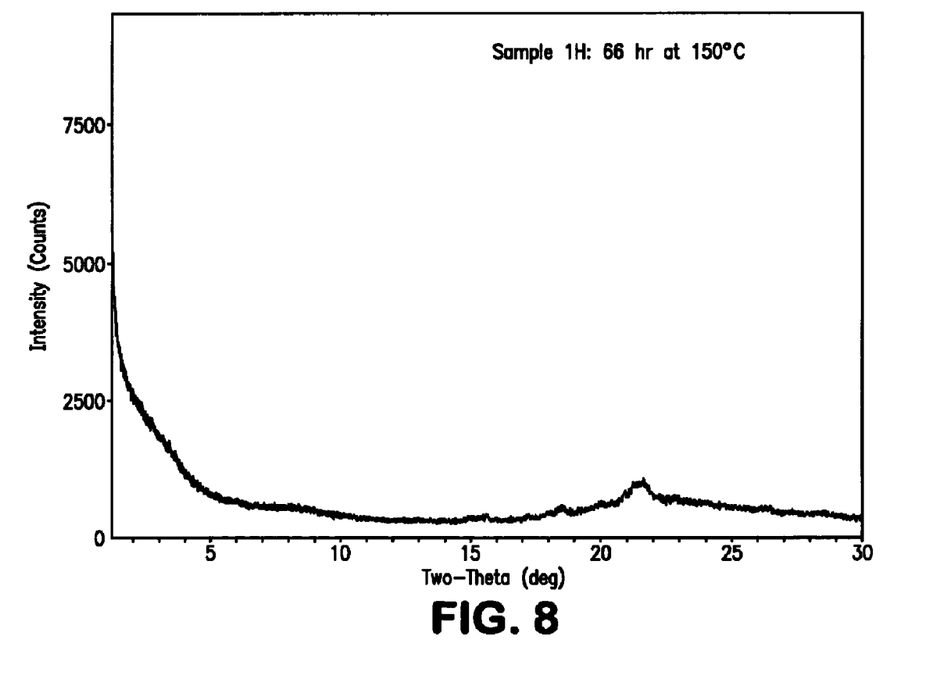
Figure 9:
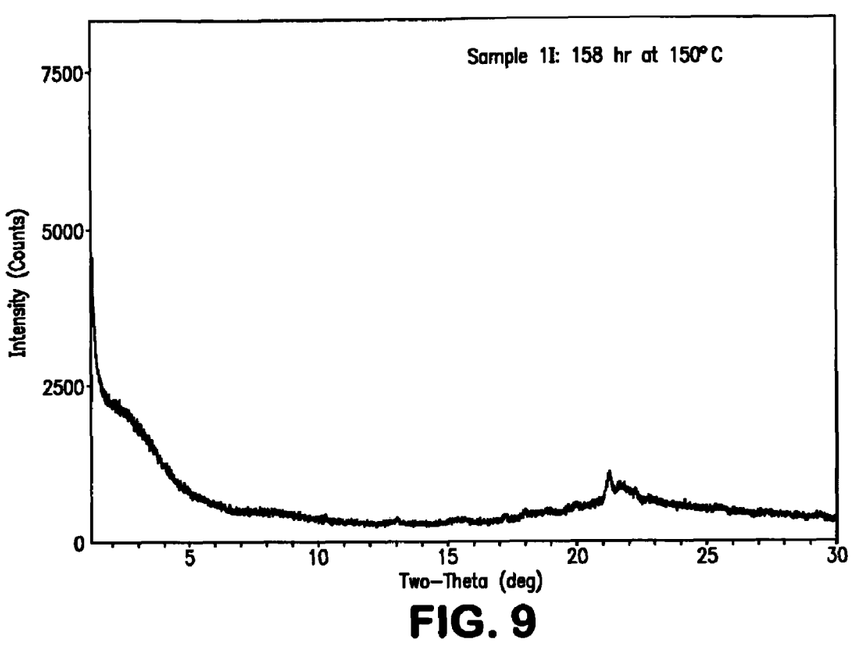
Figure 10:
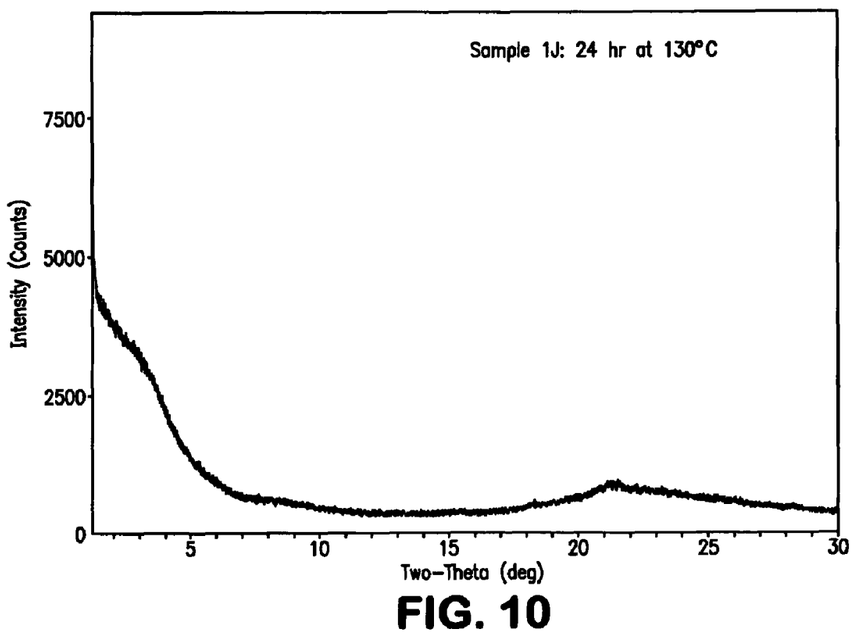
Figure 11:
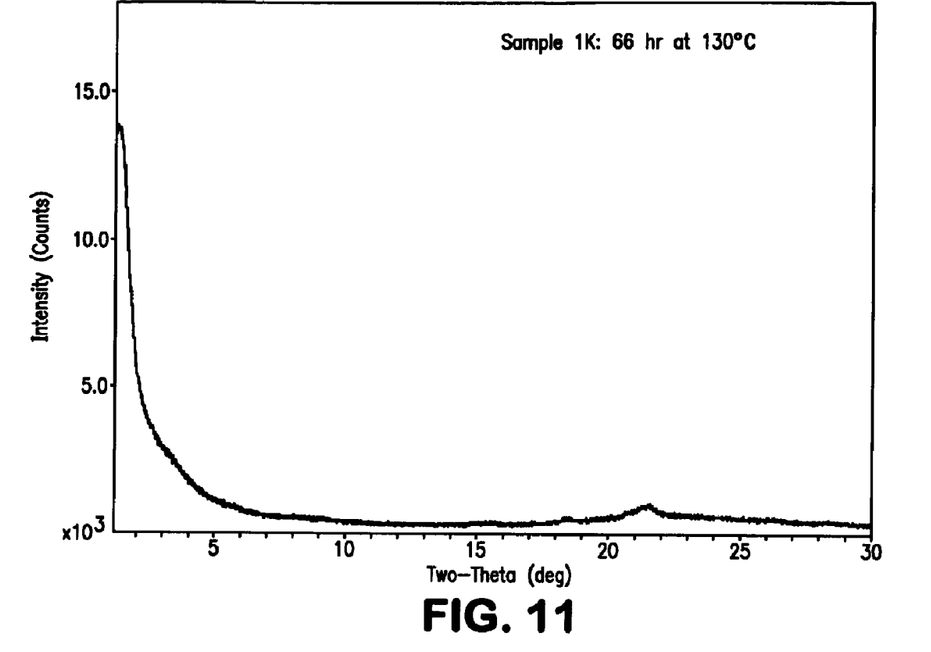
Figure 12:
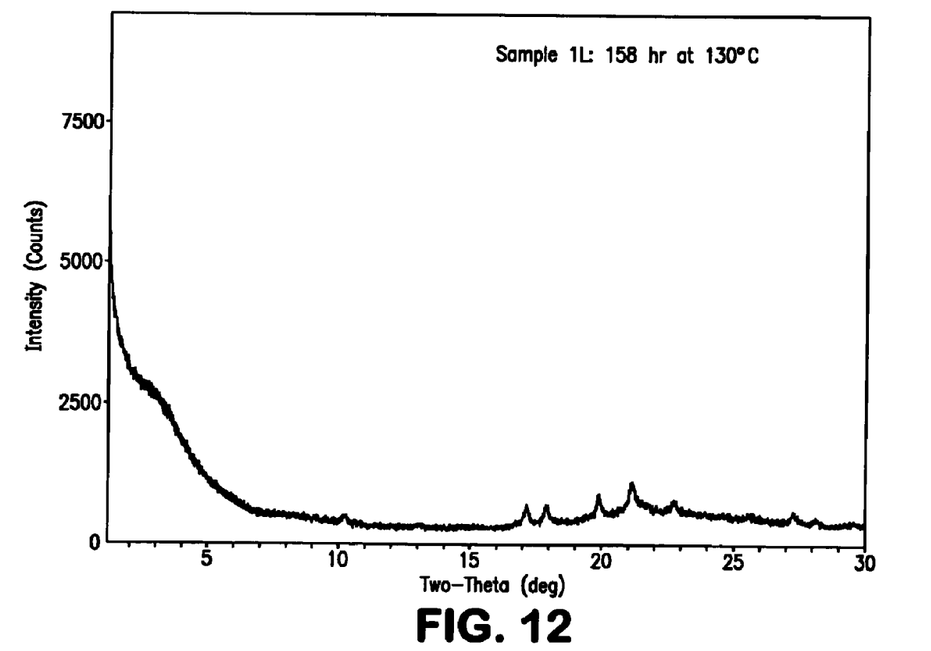

It is well known that zeolites do not grow continuously from the instant the reagents reach crystallization temperature. Instead, there is an "induction period" during which the zeolite crystals have not yet nucleated and during which the material of this invention can be grown substantially free of zeolites. For example, page 56 of the book "Molecular Sieves. Principles of Synthesis and Identification", R. Szostak, Van Nostrand Reinhold Catalysis Series, 1989, the entire contents of which are incorporated herein by reference, shows in FIGS. 2.2 (a) and (b) how the crystallinity of Na-ZSM-5 materials changes with synthesis time as estimated by infrared spectroscopy and X-ray powder diffraction. It is clear that the synthesis mixture is substantially free of ZSM-5 for the first 8 hours of this reaction, but that the ZSM-5 concentration grows rapidly thereafter.

In practice, the conditions that produce zeolitic impurities will vary with reagent ratios, the nature of the organic directing agent if any, the size and heat-up rate of the vessel, the presence of zeolitic seed impurities, and stirring rate among other conditions. For a given set of conditions, formation of zeolitic impurities (after the induction period) and formation of the material of this invention will be reproducible. If a set of data similar to those shown in FIGS. 2.2 (a) and (b) of the Szostak book is obtained for the exact set of conditions which will be used and if subsequent runs are carried out without varying the conditions, the product will be substantially zeolite free as long as the reaction time to produce the product is kept within the induction period.

The as-synthesized product contains organic compounds, and so is normally activated before use in such a manner that the organic compounds are at least partially removed to leave active catalytic sites within the pore structure of the product open for contact with a feedstock. The activation process is typically accomplished by heating the molecular sieve at a temperature of from about 200° C. to about 800° C. in the presence of an oxygen-containing gas, such as air.

To the extent desired, the original sodium and/or potassium cations of the as-synthesized material can be replaced, at least in part, with other cations by techniques well known in the art, such as ion exchange. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIIB, VIIB and VIII of the Periodic Table of the Elements.

The resultant products are useful as catalysts and catalyst supports for a variety of acid-catalyzed organic conversion reactions, such as fluid catalytic cracking, hydroprocessing and reforming.

The invention will now be more particularly described with reference to the following non-limiting Examples and the accompanying drawings.

In the Examples, testing to determine the chemisorption of $NH_3$ per gram of each of the amorphous acidic materials produced herein is conducted using a Mettler TGA/SDTA 851 thermogravimetric analysis system at ambient pressure. The amorphous acidic sample is calcined in flowing air to about 500° C. for about three hours, at least until a constant sample weight is obtained. The temperature of the sample is then reduced in flowing air (helium could also be used) to the desired temperature of chemisorption. Next, the sample is allowed to equilibrate at the desired temperature in flowing helium and weighed. Chemisorption of ammonia is measured at 250° C. After being weighed, the sample is subjected to a number of pulses (about 12 seconds/pulse) of a gaseous mixture containing helium and ammonia until a constant weight was obtained. The gas mixture contains about 10 weight percent ammonia with the remainder being helium. After each pulse of the gas mixture being tested, the amorphous acidic sample is flushed with flowing helium for about 3 minutes. About 20 separate pulses of the gas mixture are used in each test. The increase in weight of the sample in terms of mg/g material based on the amorphous acidic sample weight after calcination is used to determine the moles of $NH_3$ adsorbed per gram of amorphous acidic sample.

For the $^1H$ NMR measurements, calcined samples of the amorphous acidic materials produced herein are initially loaded into a NMR rotor and dehydrated gently by gradually raising the temperature, under vacuum, to 400° C. Typical drying protocol is to place the packed rotor in a horizontal quartz tube that is attached to a vacuum line. Typically, to avoid bumping of the samples, the quartz tube containing packed rotors is slowly evacuated to $10^{-3}$ ton at room temperature. The tube is then heated in a tube furnace to 100° C. at 1° C./min, held at 100° C./1 hr, ramped to 400° C. at 2° C./min, held at 400° C. for 10 hrs, then cooled to room temperature under vacuum. The tube is sealed off under vacuum, transferred to a glovebox and the rotors are then capped under $N_2$. All packed rotors are stored in the glovebox until ready to record the NMR data. Weights are recorded at each step of the sample preparation in order to normalize the NMR signals by weight.

The $^1H$ MAS NMR spectra are obtained on Varian InfinityPlus 400 (9.4T) NMR spectrometer. The 400 MHz spectra are recorded with a 4 mm MAS probe using 10.0-15.0 kHz spinning, 3.0-4.0 μs 90° pulses, a 30-60 s pulse delay, and averaging 32 scans. The use of 30-60 s pulse delays is very conservative and ensures quantitatively reliable peak areas. For optimum resolution it is important to optimize the room temperature shims carefully and to carefully set the magic angle using a KBr sample. Careful inspection of the spectrum of an empty MAS rotor shows a very broad signal (i.e., non-zero baseline) due to the residual H content of the probe and rotor materials. The broad residual background signal from the MAS probes and rotors is usually not a concern because it is small relative to the H content of the materials of interest in this study. In cases where the background is a concern, it can be edited out by spectral subtraction or with spin-echo techniques. Since the $T_2$s of the samples and standards are long and the probe ring down time is short, direct quantification can be achieved without the need for spin-echo techniques by using a one-pulse experiment (Tc/2-acquire) with a 10 μs pre-acquisition delay. The amount of H in each sample is determined by directly comparing the experimental spectral area to that of an external standard and normalizing by weight. A full rotor of octakis(trimethylsiloxy)silesquioxane, more commonly known as Q8M8, is used as the external quantification standard. It is solid at room temperature, has similar tuning characteristics to the materials of interest, and has one peak at about 0.3 ppm from TMS. Q8M8 is obtained from Strem Chemicals (CAS#51777-38-9). The standard and the samples are run back to back under identical conditions to minimize any effects due to the spectrometer instability. Measurements done in quadruplicate on these and experimental samples give a standard deviation of <4% for this methodology. All $^1H$ MAS NMR chemical shifts are referenced to external TMS at δH=0.0 ppm The X-ray diffraction data referred to herein are collected with a Scintag powder X-Ray Diffractometer, in a Bragg-Brentano configuration and equipped with a Peltier-cooled detector, using copper K-alpha radiation. The diffraction data are recorded by step-scanning at 0.01 to 0.02 degrees of two-theta, where theta is the Bragg angle, and count rate of two seconds per step.

Total pore volume, micropore volume, total surface area, and external surface area determinations are made by $N_2$ sorption following the standard testing method of ASTM D4365-10.

EXAMPLE 1

A sodium aluminate solution was prepared by dissolving 6 g. NaOH(99%) in 10 ml. distilled water. To this solution 7.5 g.

of aluminum trihydrate ($Al_2O_3.3H_2O$; 156.01 g./mole; ALCOA C-31) was added and the solution was heated with stirring on a hot plate/magnetic stirrer to a mild boil until the alumina dissolved. The solution was then cooled to room temperature and distilled water added to a final weight of 25 g. This solution was used as the source for the sodium aluminate in the subsequent synthesis.

The following reagents were combined in order with stirring:
  300 gms of deionized water;
  54 grams of Ludox AM-30 silica;
  5.4 grams of NaOH solution (50% by weight);
  1.5 grams of sodium aluminate ($Na_2AlO_2$); and
  17.4 grams of $(CH_3)_3N(CH_2)_4N(CH_3)_3I_2$ ($N^1,N^1,N^1,N^4,N^4,N^4$-hexamethylbutane-1,4-diammonium diiodide).

The resulting mixture had the following molar composition: 0.284 NaOH: 14.21 $(CH_3)_3N(CH_2)_4N(CH_3)_3I_2$: 94.19 $SiO_2$: $Al_2O_3$: 6640 $H_2O$ The mixture was divided into 12 equal portions and placed in twelve, 30 ml Teflon bottles. These bottles were placed in conventional autoclaves and run under the following conditions.

| Bottle | Time at temperature, hrs | Temp., ° C. |
|---|---|---|
| A | 24 | 170 |
| B | 66 | 170 |
| C | 158 | 170 |
| D | 48 | 170 |
| E | 90 | 170 |
| F | 110 | 170 |
| G | 24 | 150 |
| H | 66 | 150 |
| I | 158 | 150 |
| J | 24 | 130 |
| K | 66 | 130 |
| L | 158 | 130 |

After the appropriate time, the samples were filtered and washed with deionized water. The samples were then dried over night at 80° C. The samples were then calcined in flowing air at 500° C. (ramp 10° C./min) for three hours. The samples were then slurried with 100 ml of 1N $NH_4NO_3$ solution for one hour at room temperature and then filtered. This procedure was repeated for a total of four times using fresh solution each time for each sample. The samples were then dried over night at 80° C. The samples were then calcined in flowing air at 500° C. (ramp 10° C./min) for three hours. The X-ray diffraction patterns of these exchanged and calcined samples are shown in FIGS. 1 to 12.

Figure 13:
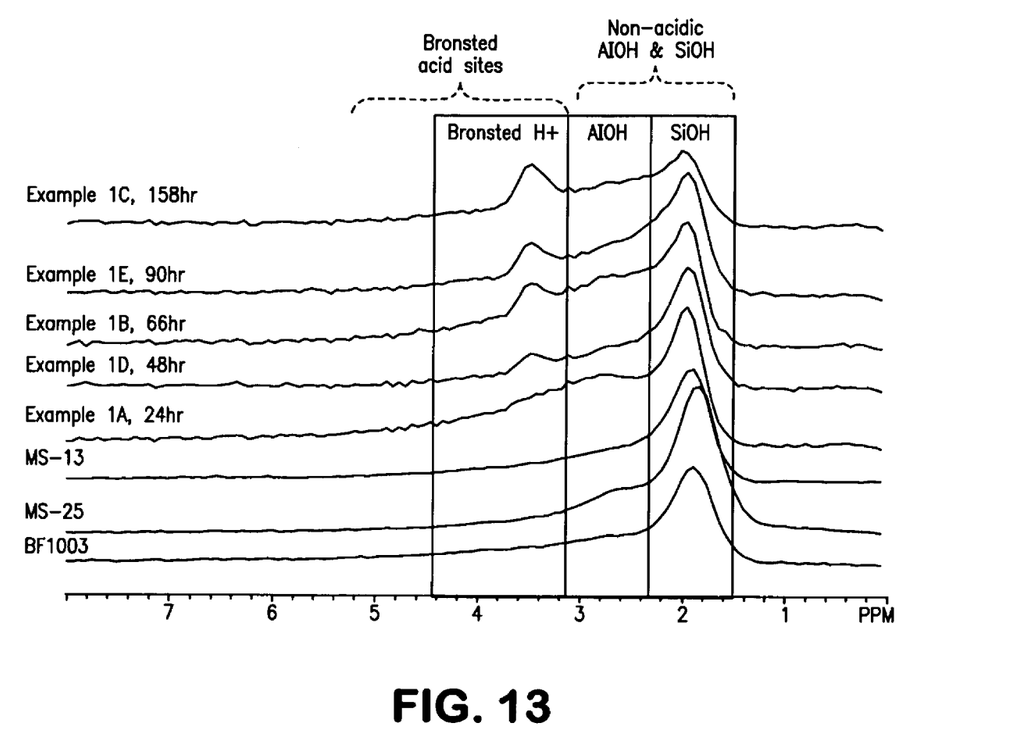
FIG. 13 gives the $^1$H MAS NMR spectra of the products obtained in Example 1 at the synthesis temperature of 170° C.

The samples produced at 170° C. were analyzed by $^1H$ MAS NMR and the data are compared in FIG. 13. These spectral data show the increasing development of peaks associated with Bronsted acid sites with increasing time at the synthesis temperature of 170° C. with a concurrent loss in non acidic hydroxyl intensity, except for the sample taken at 110 hours (Sample F). Interestingly, synthesis of this particular sample (Sample F) was automatically terminated at 110 hours during a weekend and the sample remained in the synthesis liquid for almost 72 hours before it was processed. These data may indicate the fragile state of the acidic sites prior to any thermal treatment (calcination).

FIG. 13 also provides $^1H$ MAS NMR spectra for three reference amorphous aluminosilicate materials, MS-13, MS-25 and BF-1003, all supplied by W. R. Grace. It will be seen that none of these reference materials exhibit Bronsted acid peaks in their $^1H$ MAS NMR spectra.

The calcined samples A to L were subjected to temperature programmed ammonia adsorption (TPAA) testing as well as alpha value determinations and measurements of their external and total surface area and their micropore and total pore volume. The results are shown in Table 1 below, which also lists the properties of the reference amorphous aluminosilicate materials, MS-13, MS-25 and BF-1003, for comparison.

TABLE 1

| Sample | Synthesis Temp., ° C. | Time at temperature, hrs | TPAA (mmole/g) | Alpha | Total SA ($m^2g^{-1}$) | External SA ($m^2g^{-1}$) | Micropore Volume ($cm^3g^{-1}$) | Total Pore Volume ($cm^3g^{-1}$) |
|---|---|---|---|---|---|---|---|---|
| A | 170 | 24 | 0.009 | 0.7 | 82.4 | 75.8 | 0.00145 | 0.525 |
| B | 170 | 66 | 0.023 | 0.8 | 59.4 | 52.6 | 0.002172 | 0.246 |
| C | 170 | 158 | 0.019 | 1.1 | 50.8 | 37.5 | 0.005375 | 0.161 |
| D | 170 | 48 | 0.036 | | 76.4 | 49.9 | 0.01166 | 0.19 |
| E | 170 | 90 | 0.055 | 1.1 | 65.8 | 33.2 | 0.0142 | 0.22 |
| F | 170 | 110 | 0.000 | 0.8 | 58 | 36.6 | 0.009635 | 0.163 |
| G | 150 | 24 | 0.045 | 1.3 | 118.2 | 87.8 | 0.013184 | 0.581 |
| H | 150 | 66 | 0.000 | | 91.2 | 63.7 | 0.01254 | 0.369 |
| I | 150 | 158 | 0.000 | | 76 | 50 | 0.01182 | 0.1824 |
| J | 130 | 24 | 0.080 | 1 | 159.3 | 127 | 0.0128 | 0.967 |
| K | 130 | 66 | 0.019 | | 117.3 | 96 | 0.00806 | 0.903 |
| L | 130 | 158 | 0.007 | | 96 | 87 | 0.0023 | 0.81 |
| MS-13 | | | | 1.1 | | | | |
| BF-1003 | | | | 2.5 | | | | |
| MS-25 | | | | 3.5 | 418 | | | |

EXAMPLE 2

The following reagents were combined in order with stirring:
  600 gms of deionized water;
  108 grams of Ludox AM-30 silica;
  10.8 grams of NaOH solution (50% by weight);
  3 grams of sodium aluminate ($Na_2AlO_2$) of Example 1; and
  35 grams of $(CH_3)_3N(CH_2)_4N(CH_3)_3I_2$ ($N^1,N^1,N^1,N^4,N^4,N^4$-hexamethylbutane-1,4-diaminium diiodide).

Figure 14:
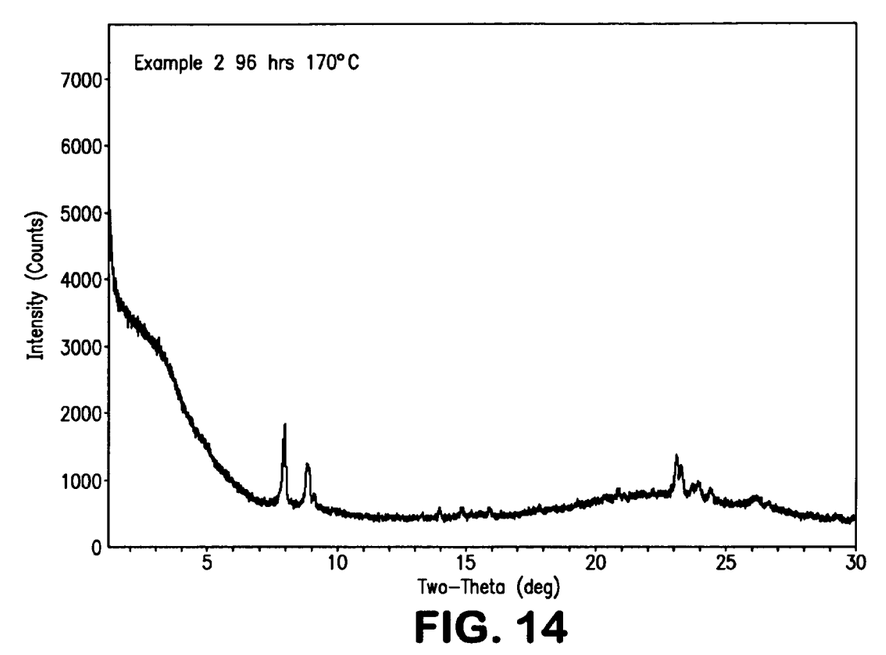
FIG. 14 is an X-ray diffraction pattern of the product obtained in Example 2.

This mixture was then added to a Telfon lined 600 ml autoclave and hydrothermally treated under the conditions of 170° C./96 hours with no stirring. After 96 hours, the sample was filtered and washed with deionized water. The sample was then dried over night at 80° C. The sample was then calcined in flowing air at 500° C. (ramp 10° C./min) for three hours. The sample was then slurried with 100 ml of 1N $NH_4NO_3$ solution for one hour at room temperature and then filtered. This procedure was repeated for a total of four times using a fresh $NH_4NO_3$ solution each time. The sample was then dried over night at 80° C. The sample was then calcined in flowing air at 500° C. (ramp 10° C./min) for three hours. The X-ray diffraction pattern of the exchanged and calcined sample is shown in FIG. 14 and demonstrates the presence of ZSM-5 in the product. The alpha value of the exchanged, calcined material was 23.

EXAMPLE 3

The following reagents were combined in order with stirring:
  600 gms of deionized water;
  108 grams of Ludox AM-30 silica;
  10.8 grams of NaOH solution (50% by weight);
  3 grams of sodium aluminate ($Na_2AlO_2$) of Example 1; and
  35 grams of $(CH_3)_3N(CH_2)_4N(CH_3)_3I_2$ ($N^1,N^1,N^1,N^4,N^4,N^4$-hexamethylbutane-1,4-diaminium diiodide).

Figure 15:
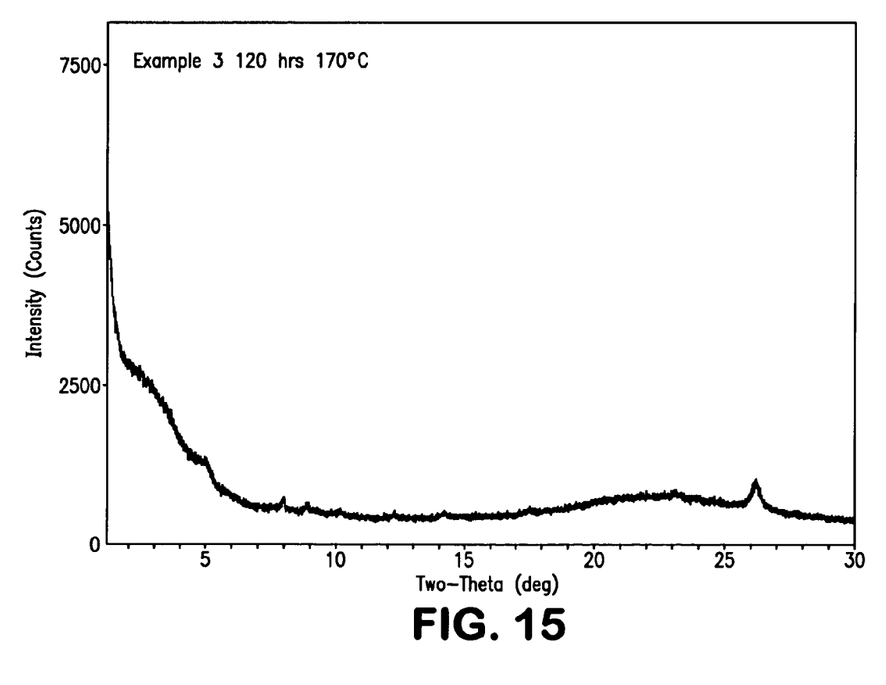
FIG. 15 is an X-ray diffraction pattern of the product obtained in Example 3.

This mixture was then added to a Telfon lined 600 ml autoclave and hydrothermally treated under the conditions of 170° C./120 hours with no stirring. After 120 hours, the sample was filtered and washed with deionized water. The sample was then dried over night at 80° C. The sample was then calcined in flowing air at 500° C. (ramp 10° C./min) for three hours. The sample was then slurried with 100 ml of 1N $NH_4NO_3$ solution for one hour at room temperature and then filtered. This procedure was repeated for a total of four times using A fresh $NH_4NO_3$ solution each time. The sample was then dried over night at 80° C. The sample was then calcined in flowing air at 500° C. (ramp 10° C./min) for three hours. The X-ray diffraction patterns of the exchanged and calcined sample is shown in FIG. 15 and demonstrates the presence of ZSM-5 in the product. The alpha value of the exchanged, calcined material was 2.2.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of synthesizing a porous material comprising oxides of silicon and aluminum and being substantially free of X-ray diffraction peaks in its calcined form, wherein the material has the following properties:
  (a) a Bronsted acid site density as measured by temperature programmed ammonia adsorption of at least 0 005 mmol/g;
  (b) an alpha value of at least 0.5;
  (c) a specific surface area of about 50 to about 160 $m^2\ g^{-1}$;
  (d) a total pore volume of about 0.14 to about 1.0 $cm^3\ g^{-1}$; and
  (e) a micropore volume of about 0.001 to about 0.015 $cm^3\ g^-$, the method comprising:
  (i) preparing a reaction mixture comprising water, a source of silica, a source of alumina and an organic compound selected from the group consisting of diquaternary ammonium compounds of the formula $(CH_3)_3N(CH_2)_nN(CH_3)_3X_2$, where a ranges from 2 to 10 and X can be Cl, Br, and I, (2-hydroxyethyl)ammonium compounds and mixtures thereof; and
  (ii) heating the reaction mixture at a temperature of about 100° C. to about 200° C. for a time of about 12 hours to about 200 hours.

2. The method of claim 1, wherein the material has a Bronsted acid site density as measured by temperature programmed ammonia adsorption of about 0.01 to about 0.08 mmol/g.

3. The method of claim 1, wherein the material has an alpha value of about 0.5 to about 2.

4. The method of claim 1, wherein the material has an alpha value of about 0.7 to about 1.3.

5. The method of claim 1, wherein the material has a total pore volume of about 0.15 to about 0.97 $cm^3\ g^{-1}$.

6. The method of claim 1, wherein the material has an $^1H$ NMR spectrum including a peak characteristic of Bronsted acidity at around 3.5 ppm.

7. The method of claim 1 wherein the material has a silica to alumina molar ratio of about 1 to about 1000.

8. The method of claim 1, wherein the material has a silica to alumina molar ratio of about 5 to about 200.

9. The method of claim 1, wherein n is 4.

10. The method of claim 1, wherein said reaction mixture comprises a source of alkali metal cations.

11. The method of claim 10, wherein the alkali metal is sodium.

12. An organic conversion process comprising synthesizing a porous material according to the method of claim 1 and contacting an organic feedstock under conversion conditions with the porous material.

* * * * *